United States Patent [19]

Lindemann

[11] Patent Number: 4,496,365

[45] Date of Patent: Jan. 29, 1985

[54] METHOD OF PRODUCING BRIQUETTES FROM ORGANIC WASTE PRODUCTS

[76] Inventor: Rolf W. Lindemann, Birkenhügel 6, Ritterhude, Fed. Rep. of Germany

[21] Appl. No.: 517,922

[22] Filed: Jul. 27, 1983

Related U.S. Application Data

[63] Continuation-in-part of Ser. No. 242,126, Mar. 9, 1981, abandoned.

[30] Foreign Application Priority Data

Mar. 17, 1980 [DE] Fed. Rep. of Germany ....... 3010259

[51] Int. Cl.³ ............................ C10L 5/44; C10L 5/46
[52] U.S. Cl. ..................................... 44/1 D; 44/10 A; 44/10 L
[58] Field of Search ............. 44/1 D, 10 A, 26, 10 G, 44/10 L

[56] References Cited

U.S. PATENT DOCUMENTS

| | | | |
|---|---|---|---|
| 150,393 | 5/1874 | Broad | 44/26 |
| 1,668,660 | 5/1928 | Shimamoto | 44/26 |
| 3,910,775 | 10/1975 | Jackman | 44/1 D |
| 4,026,678 | 5/1977 | Livingston | 44/1 D |
| 4,102,277 | 7/1978 | Wall | 44/1 D |
| 4,372,749 | 2/1983 | Nielsen | 44/1 D |

FOREIGN PATENT DOCUMENTS 2046299  11/1980  United Kingdom ................ 44/1 D

*Primary Examiner*—Carl F. Dees
*Attorney, Agent, or Firm*—Michael J. Striker

[57] ABSTRACT

In a method of producing fuel briquettes from organic waste products calcium oxide together with the enriching coal are added to the waste organic products subjected to high pressures to produce sterilized fuel briquettes of high heating values.

2 Claims, No Drawings

METHOD OF PRODUCING BRIQUETTES FROM ORGANIC WASTE PRODUCTS

This application is a continuation-in-part of Ser. No. 242,126, 3/9/81, abandoned.

BACKGROUND OF THE INVENTION

The present invention relates to a method of producing a pelletized fuel from garbage, sludge or any other waste materials.

More particularly, the invention relates to a method of producing briquettes from house garbage or waste sludge by means of enriching the waste organic products with organic materials of a high constant heat value, for example coal and under application of pressures to the products.

Methods of making briquettes or pellets from waste products have been known in the art. One of such methods is described, for example in U.S. Pat. No. 3,910,775. This patent discloses a method and apparatus for processing organic waste products, such as refuse, sewage or the like to produce briquettes. In a continuous process the collected refuse is first freed from ferromagnetic articles, then shredded and conveyed, with the addition of acidic waste, into a rolling mill which dewaters and forms the refuse and waste mixture into briquettes. These briquettes can be either used as a fuel or used as a filtering material in the device for dewatering sewage sludge before they are finally burned out. Due to the pressure applied to the mixture of the refuse and waste in the rolling mill a partial sterilization of organic waste products with respective destruction of pathological germs can be obtained and briquettes which can be easily transported and stored can be produced. However, a complete sterilization of the waste products has not been yet possible with known conventional methods of making briquettes from waste products. In the method disclosed in the above mentioned patent the mixture of refuse with acidic waste is utilized for producing briquettes. This mixture of waste obtained from a coal processing is used mainly to produce briquettes which can serve as a filtering material for separating phosphates from the sludge in a sludge processing.

One of the known methods of the foregoing type is also disclosed in the FR-A-994 789. The French publication describes a method of producing briquettes from organic waste products by compressing a mixture of waste products under pressures of about 800 bar where a partial melting of the products takes place to avoid an addition of a special binder. However, in this conventional method a satisfactorily high heat value and complete sterilization of the final product are not achieved. Thus, the method disclosed in the French publication as well as other known prior art publications do not suggest means which could lead to the production of commercially available briquettes made out of waste and suitable as solid fuel for heating houses and industrial buildings.

SUMMARY OF THE INVENTION

It is an object of the present invention to provide an improved method of producing briquettes from organic waste products.

It is another object of the invention to produce briquettes which would be a commercially available fuel material suitable for heating houses and industrial buildings.

These and other objects of the invention are attained by a method of producing briquettes from organic waste products by enriching with organic materials of high heating value, such as coal, by adding lime (CaO) and by subsequently compressing under predetermined high pressure reaction temperatures of about 100°–120° C., to obtain the final product of a desired high heating value.

The organic waste products being processed are subjected to friction heat and exothermal heating due to chemical reaction of lime (CaO) under said temperatures, and the briquettes maintained a temperature of more than 70° C. for more than 30 minutes. The pH-value displacement and the thermic sterilisation results in a complete hygienisation of the waste products contained in the briquettes.

It should be noted that the term pH-value displacement defines a change in a pH-value. PH-value is, according to an international definition, the proton activity of an electrolyte.

A neutral pH value is usually known as pH-7. Smaller values of "pH" define a greater acid content in the product whereas greater values of "pH" indicate an alkaline area.

DETAILED DESCRIPTION OF THE PREFERRED EMBODIMENT

In the method according to the invention organic waste products are first enriched with coal or any other product having a high heating value to obtain a product of a desired high heating value. The initial products are compressed with the addition of coal under pressure of more than 1000 bar, preferably under pressure of between 1000 and 1300 bar and under output temperatures of more than 100° C. Organic waste products, particularly house garbage, sewage sludge with the added coal are processed in a manner that a mixture is obtained which has a predetermined high heating value. The amount of coal utilized for processing must be selected so that the high constant value of the briquettes should be guaranteed. Before the waste products and coal are inserted into a suitable press for compressing, lime (CaO) is added to the mixture after the latter has been subjected to shredding. All the ingredients of the mixture are mixed and compressed under very high pressures of 1000–1300 bar as has been noted above to produce briquettes of the final shape.

When CaO (calcium oxide) together with the enriching coal are added to the original waste organic products due to high pressures, for example 1000–1300 bar and due to a friction heat, which takes place in a compression step, temperatures of about 120° C. result. The addition of calcium oxide and the resulting formation of $Ca(OH)_2$ lead to pH-value change or displacement in an alkaline region (about pH-12). The output or reaction temperature of the fuel briquettes obtained in the compression operation is so high that more than 70° C. can be maintained for more than 30 minutes. This process—the pH-value displacement and the thermic sterilisation—results in a complete hygienisation of the waste products contained in fuel briquettes.

Furthermore, due to very high compression pressures and friction heat accompanied with exothermal reation heat a pre-carbonisation of the cell structure and the paper molecule groups occur; this structure undergoes chemical and thermal structure change due to the high compression which results in an increasing of the heating value.

EXAMPLE

Refuse or garbage of a predetermined amount is introduced into a magnetic separator of a conventional kind in which ferromagnetic articles are removed from the refuse in the known manner. The refuse is then introduced into a shredder, also of the known type, in which the refuse is shredded; the shredded waste or refuse is then fed into a mixer by means of a known conveyor.

15% of fine coal and 5% of line (CaO) are admixed to the shredded waste in a mixer of any suitable known structure to obtain a homogeneous mixture which is then fed into a press, also of any known construction, in which the mixture is compressed under the pressure of 1300 bar and briquettes of the final shape are formed. The process is so controlled that, due to the selection of the type of lime and the duration of the mixing, lime undergoes a guenching process in the press.

The particular economical value of the process of the invention is achieved because, due to enriching of waste products, like garbage, sludge etc., a high grade fuel is obtained which would have a constant heating value; this fuel can not only be used as an auxilliary fuel in times of energy crisis, but can be also utilized as an economical universal fuel, e.g. as a household fuel or for producing generator and synthetic gas or for further conversions of the hydrocarbon groups.

Commercially available solid fuel with heating values of 4000 to 4800 Kcal and higher can be produced without any difficulties by the method according to the invention.

It will be understood that each of the elements described above, or two or more together, may also find a useful application in other types of methods of producing fuel briquettes differing from the types described above.

While the invention has been illustrated and described as embodied in a method of producing fuel briquettes, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A method of producing fuel briquettes from organic waste products by enriching waste products with organic materials of high heating value, such as coal, comprising compressing the organic waste products with the addition to them, together with coal or other organic products of high heating value used for enriching, lime (CaO) under high pressures of at least 1000 bar whereupon a compressing process with reaction temperatures of about 100°–120° C. results and a product of a desired high heating value is obtained.

2. The method as defined in claim 1, wherein the organic waste products are subjected to additional exothermal heating due to a chemical reaction of lime (CaO) under said temperatures so that the output temperature of the fuel briquettes is so high, that more than 70° C. can be maintained for more than 30 minutes, whereby combination of high temperatures with the pH-value displacement results in complete hygienisation of the final product.

* * * * *